(12) United States Patent
Pirkl et al.

(10) Patent No.: US 12,071,919 B2
(45) Date of Patent: Aug. 27, 2024

(54) NOZZLE FOR INJECTING FUEL

(71) Applicant: LIEBHERR-COMPONENTS DEGGENDORF GMBH, Deggendorf (DE)

(72) Inventors: Richard Pirkl, Regensburg (DE); Alexander Preis, Regen (DE); Klaus Lichtinger, Geiselhoering (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 932 days.

(21) Appl. No.: 16/973,394

(22) PCT Filed: Jun. 4, 2019

(86) PCT No.: PCT/EP2019/064464
§ 371 (c)(1),
(2) Date: Jul. 12, 2021

(87) PCT Pub. No.: WO2019/234006
PCT Pub. Date: Dec. 12, 2019

(65) Prior Publication Data
US 2021/0348584 A1 Nov. 11, 2021

(30) Foreign Application Priority Data
Jun. 8, 2018 (DE) ............ 10 2018 113 660.9

(51) Int. Cl.
*F02M 61/16* (2006.01)
*B23K 26/382* (2014.01)
*F02M 61/18* (2006.01)

(52) U.S. Cl.
CPC ......... *F02M 61/168* (2013.01); *B23K 26/389* (2015.10); *F02M 61/1806* (2013.01)

(58) Field of Classification Search
CPC . F02M 61/168; F02M 61/1806; B23K 26/389
See application file for complete search history.

(56) References Cited

U.S. PATENT DOCUMENTS

| 6,070,813 A | 6/2000 | Durheim |
| 2005/0205693 A1 | 9/2005 | Teschner et al. |

(Continued)

FOREIGN PATENT DOCUMENTS

| CN | 101545438 A | 9/2009 |
| CN | 103717345 A | 4/2014 |

(Continued)

OTHER PUBLICATIONS

State Intellectual Property Office of the People's Republic of China, Office Action and Search Report Issued in Application No. 201980038265.1, Apr. 14, 2022, 12 pages. (Submitted with Partial Translation).

(Continued)

*Primary Examiner* — Jacob M Amick
*Assistant Examiner* — Charles J Brauch
(74) *Attorney, Agent, or Firm* — McCoy Russell LLP

(57) ABSTRACT

The present invention relates to a nozzle for injecting fuel comprising an orifice in the region of a nozzle tip for leading fuel out of the nozzle and a reception hole for receiving a nozzle needle, wherein the reception hole has a seat region for a sealing closing by a nozzle needle to enable a fuel supply to the orifice in dependence on a position of the nozzle needle, characterized in that the longitudinal axis of the orifice is directed toward a region of the reception hole that adjoins the side of the seat region remote from the nozzle tip.

14 Claims, 2 Drawing Sheets

(56) References Cited

U.S. PATENT DOCUMENTS

| | | |
|---|---|---|
| 2010/0032859 A1 | 2/2010 | Ryou et al. |
| 2016/0237970 A1 | 8/2016 | Gami |
| 2016/0341165 A1 | 11/2016 | Ishikawa et al. |

FOREIGN PATENT DOCUMENTS

| | | | |
|---|---|---|---|
| CN | 105143659 A | 12/2015 | |
| CN | 107429652 A | 12/2017 | |
| DE | 19915874 A1 | 10/1999 | |
| EP | 1312796 A2 * | 5/2003 | ......... F02M 51/0671 |
| EP | 3252301 A1 | 12/2017 | |
| FR | 1190361 A | 10/1959 | |
| WO | 2014174906 A1 | 10/2014 | |

OTHER PUBLICATIONS

ISA European Patent Office, International Search Report Issued in Application No. PCT/EP2019/064464, Sep. 13, 2019, WIPO, 4 pages.

\* cited by examiner

NOZZLE FOR INJECTING FUEL

CROSS REFERENCE TO RELATED APPLICATIONS

The present application is a U.S. National Phase of International Application No. PCT/EP2019/064464 entitled "NOZZLE FOR INJECTING FUEL," and filed on Jun. 4, 2019. International Application No. PCT/EP2019/064464 claims priority to German Patent Application No. 10 2018 113 660.9 filed on Jun. 8, 2018. The entire contents of each of the above-listed applications are hereby incorporated by reference for all purposes.

TECHNICAL FIELD

The present invention relates to a nozzle for injecting fuel.

BACKGROUND AND SUMMARY

In internal combustion engines such as diesel engines or also gasoline engines a fuel is as a rule injected via a nozzle into a combustion chamber in a specific quantity and for a specific time period. It is necessary in this process due to the very small injection times that are in the microsecond range to open or close the outlet opening of the nozzle at a very high frequency.

Since the basic functional principle of a nozzle is familiar to the skilled person, some aspects that are of advantage for the basic understanding of the invention will only be looked at briefly in the following.

A nozzle typically has a nozzle needle (also: injector needle) that allows a highly compressed fuel to exit outwardly on release of a discharge hole of the needle. This nozzle needle acts in cooperation with this outlet opening as a plug that enables an exit of the fuel when raised. It is therefore accordingly necessary to raise this needle at relatively short time intervals and to allow it to slide back into the outlet opening after a brief period. In this respect, hydraulic servo valves can be used that control the triggering of this movement. It thus becomes possible to convey the required fuel amount into the combustion chamber at the desired times. It is not absolutely necessary here that the nozzle needle directly closes the discharge hole, but rather only the fuel flow to be led out of the discharge hole can rather be interrupted by means of the nozzle needle, for example by a sealing placing onto a seat surface of the nozzle.

It is known from the prior art to produce the very small bores of the orifices using an erosion process.

In this process, more in-depth investigations have shown that the surface property (in particular the roughness) of nozzle orifices has a great effect on the emission behavior of the internal combustion engine interacting with the nozzle. Very smooth orifices have an advantage and make a significant contribution to smaller emission values. The orifices typically produced using an erosion process are therefore hydro-erosively rounded in which an abrasive fluid mixed with grinding particles is pumped through the orifices at a high pressure up to (120 bar) such that a certain smoothing of the eroded orifices is achieved.

For the aforesaid reasons, there have long been endeavors to produce the orifices by means of laser drilling since this results in a considerably smoother surface than the erosion process with subsequent hydro-erosive rounding. Further advantages here include a fast cycle time, smaller borehole diameters, a lower heat input in surfaces, no consumables, and a better reproducibility of the holes.

It is problematic in this respect that a nozzle has to be deactivated directly after the penetration into the blind hole on the laser drilling of the orifice since otherwise the oppositely disposed blind hole wall or the oppositely disposed seat region will be damaged by the laser. A graphical representation of this situation can be found in FIG. 1. Under certain circumstances, a drilling through of the oppositely disposed wall may even occur.

In addition, it may be necessary to produce the orifice such that the laser first penetrates the complete orifice and subsequently enlarges the latter by a circular or helical movement.

However, since it is as a rule not always possible to deactivate the laser sufficiently fast and precisely, it is necessary to screen the oppositely disposed blind hole wall to prevent damage by the laser. This procedure is also called back wall protection in technical circles.

It is the aim of the present invention to provide a nozzle having an orifice that does not have the above-listed disadvantages. This is done using a nozzle that has all the features of claim 1. Advantageous aspects of the invention are listed in the dependent claims here.

A nozzle in accordance with the invention for injecting fuel here comprises an orifice in the region of a nozzle tip for leading fuel out of the nozzle and a reception hole for receiving a nozzle needle, wherein the reception hole has a seat region for a sealing closing by a nozzle needle to enable a fuel supply to the orifice in dependence on a position of the nozzle needle. The nozzle is characterized in that the longitudinal axis of the orifice is directed toward a region of the reception hole that adjoins the side of the seat region remote from the nozzle tip.

Damage to the seat region or blind hole section disposed opposite the orifice can thereby no longer occur on a drilling of the orifice by means of laser. These functionally relevant regions (seat region and/or blind hole) thus remain free of damage, whereby the total waste of the nozzle can also be considerably reduced on a laser drilling of the orifice.

The distance from the oppositely disposed surface is larger, whereby the laser can reduce its energy up to the incidence on the wall. If damage should nevertheless occur, it is outside the functionally relevant region of the nozzle. It is moreover conceivable that possible damage can be removed by a drilling or grinding subsequent to the laser drilling of the orifice by a corresponding allowance in the region that adjoins the side of the seat region remote from the nozzle tip.

In accordance with an optional modification of the invention, the orifice is a drilled orifice, with the longitudinal axis corresponding to the drilling axis of the orifice.

Provision can moreover be made in accordance with the invention that a blind hole is provided at the side of the seat region facing the nozzle tip. The blind hole is thus closed on the one side of the seat region and that region is closed on the other side to which the drilling axis of the orifice is directed.

It is clear to the skilled person that there are different forms of the tip of the nozzle (also: injector). With a so-called seat hole nozzle, the nozzle holes are directly closed by the valve member (jet needle).

With the blind hole nozzle, a residual volume (in the blind hole) is provided beneath the nozzle seat in which residual fuel remains that was not injected through the nozzle holes. This can have the consequence of an increased emission of non-combusted fuel elements in the exhaust gas and of an increased tendency of the nozzle to coke. However, more favorable flow conditions can be achieved by a mixed volume disposed upstream of the nozzle holes. The invention is not restricted to one of the two aforesaid nozzle forms, but is rather advantageous with both types.

Provision is preferably made that the orifice is a hole drilled by means of laser. An orifice drilled by means of laser can be easily recognized by the skilled person since it has a much smoother surface than a conventionally drilled and hydro-erosively rounded hole.

Provision can furthermore be made in accordance with an advantageous modification that the seat region is an approximately funnel-shaped region that converges in the direction of the tip of the nozzle and/or that the seat region approximately corresponds to the jacket surface of a truncated cone that converges in the direction of the tip of the nozzle.

Provision can be made that a blind hole adjoins the side of the seat region facing the nozzle tip and has an approximately sack shape and/or adjoins the lower peripheral edge of the seat region. It is clear to the skilled person that the blind hole can also adopt different shapes that are likewise covered by the invention. A conical or cylindrical shape are, for example, conceivable for the blind hole here.

Provision can be made in accordance with a further preferred embodiment of the invention that the orifice enters into the reception hole of the nozzle at the level of the seat region. In other words, the inner opening of the orifice is in the seat region of the nozzle.

An angle can thereby be achieved that is small with respect to the normal plane of the longitudinal extent of the nozzle and simultaneously the desired alignment of the drilling axis of the orifice toward the desired region can be achieved. A small angle can be of advantage on the leading of fuel out of the nozzle under certain circumstances.

Provision can be made in accordance with a further embodiment that the orifice enters into the reception hole of the nozzle at the level of the blind hole. In other words, the inner opening of the orifice is in the blind hole of the nozzle.

Provision is made in accordance with an optional modification of the invention that the longitudinal axis of the orifice includes an angle to the normal plane of the longitudinal axis of the nozzle that amounts to at least 15°, preferably at least 25°, and more preferably at least 35°. In accordance with a particularly preferred embodiment, the angle can amount to at least 45° or even better at least 50°.

The invention further relates to a method of producing a nozzle, preferably of producing a nozzle in accordance with one of the preceding aspects listed, wherein, in the method, an orifice of the nozzle for the discharge of fuel is produced by means of laser drilling and a reception hole for receiving a nozzle needle is produced that hollows out the nozzle along its longitudinal extent, with the reception hole being produced such that it has a seat region for a sealing closing with a nozzle needle to enable a fuel supply to the orifice in dependence on a position of the nozzle needle. The method is characterized in that on the drilling of the orifice with a laser, the drilling axis of the laser is directed toward a region of the reception hole that adjoins the side of the seat region remote from the nozzle tip.

On an optional modification of the method, the drilling axis is aligned during drilling such that the longitudinal axis of the orifice includes an angle to the normal plane of the longitudinal axis of the nozzle that amounts to at least 15°, preferably at least 25°, and more preferably at least 35°. In accordance with a particularly preferred embodiment, the angle can amount to at least 45° or even better at least 50°.

BRIEF DESCRIPTION OF THE FIGURES

Further details, features, and advantages of the invention will become visible with reference to the following description of the Figures. There are shown.

DETAILED DESCRIPTION

Figure 1:
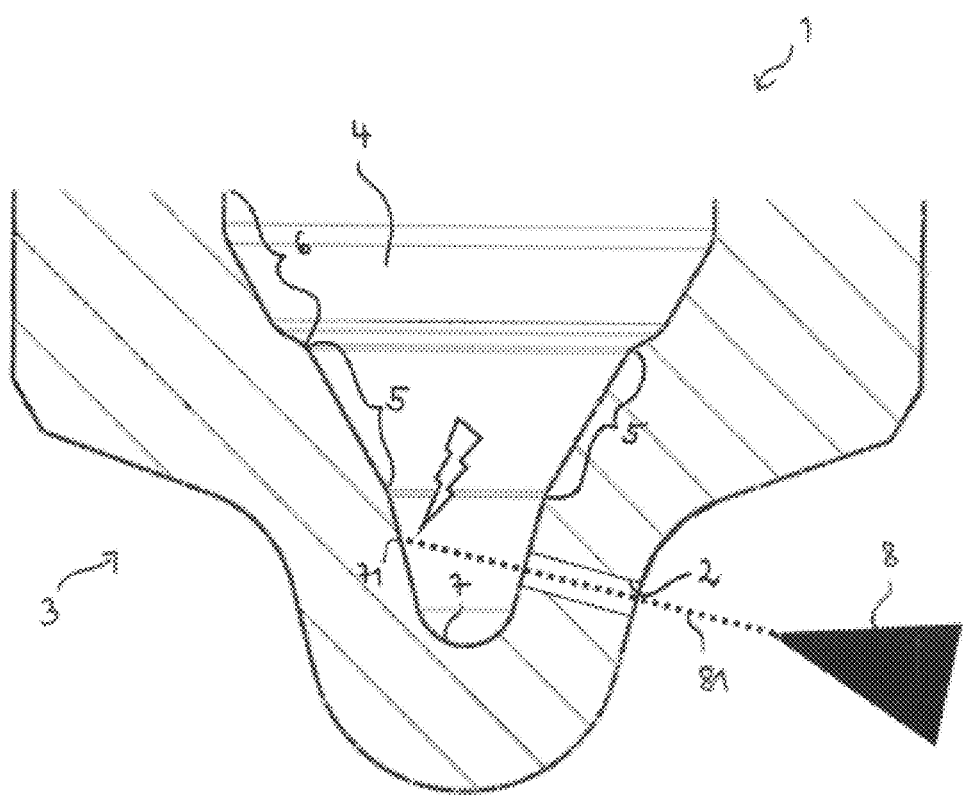
FIG. 1: a sectional view of a nozzle tip during a production method in accordance with the prior art.

FIG. 1 shows a sectional view of a tip of a nozzle 1 for injecting fuel.

As already explained in the introductory part of the description, it is customary in accordance with the prior art to drill the orifice 2 with the aid of a laser 8. The oppositely disposed region 71 of the blind hole 7 can be damaged in this process after the laser beam 81 has passed through, for example. This damage is graphically shown by a lightning symbol. Such damage must be avoided at all costs since otherwise the nozzle becomes unusable. An approximately funnel-shaped region 5 that expands upwardly away from the tip 3 of the nozzle 1 adjoins the blind hole 7 here. The region 5 can, however, also be cylindrically shaped and is not restricted to its funnel shape. It is the seat region 5 of the jet needle that, in interaction with the jet needle, can interrupt or permit a fluid communication of highly pressurized fuel (and thus the discharge of fuel through the nozzle).

The center nozzle bore 6 adjoins above the seat region 5, that is adjoins the side remote from the tip 3 of the nozzle 1.

Figure 2:
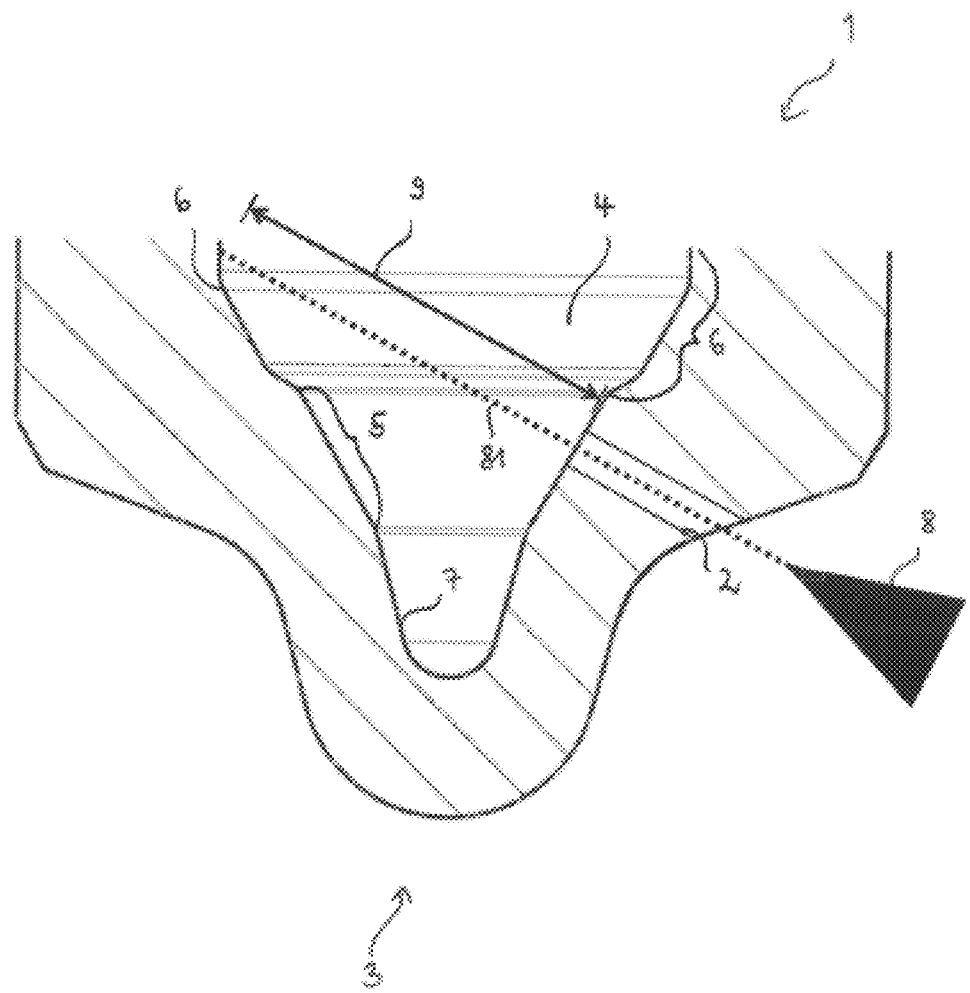
FIG. 2: a sectional view of a nozzle tip of a nozzle in accordance with the invention on a laser drilling of the orifice.

FIG. 2 shows the nozzle in accordance with the invention during a production process. The at least one orifice 2 is here formed by laser drilling. The orifice 2 produced by the laser 8 penetrates the reception hole 4 in the seat region 5 in this process. The drilling axis is aligned here such that the laser beam 81 that passes through into the reception hole and that necessarily lies on the drilling axis is directed toward a region in the reception hole 4 that adjoins the side of the seat region remote from the nozzle tip 3.

This brings about two advantages. On the one hand, with a laser beam 81 aligned in this manner, a functionally relevant region (seat region 5 or blind hole 7) is also not damaged after a penetration into the reception hole 4. On the other hand, due to the greater distance (marked by reference numeral 9) between the inner opening of the orifice 2 and the surface 6 affected by the laser beam 81 after penetration into the reception hole 4, there is a greater energy reduction of the laser beam 81 up to the incidence on the targeted point. Any damage thus occurs in a less pronounced manner. In addition, damage only occurs in a region that is not relevant to the function or performance of the nozzle.

It can further be recognized in FIG. 2 of the invention that the inclination of the orifice 2 is greater than that inclination of the orifice from the already known nozzle (shown in FIG. 1). It is of advantage in accordance with the invention for the inclination to have an angle with the normal plane of the longitudinal direction of the nozzle 1 that exceeds 15° or, as shown in the Fig., is at 27°.

The invention claimed is:

1. A nozzle for injecting fuel comprising:
an orifice in a region of a nozzle tip for leading fuel out of the nozzle; and
a reception hole for receiving a nozzle needle, wherein the reception hole has a seat region for a sealing closing with the nozzle needle to enable a fuel supply to the orifice based on a position of the nozzle needle,
wherein
a longitudinal axis of the orifice is directed toward a region of the reception hole that adjoins, and is distant from, a side of the seat region remote from the nozzle tip.

2. The nozzle in accordance with claim 1, wherein the orifice is a drilled orifice and the longitudinal axis corresponds to a drilling axis of the orifice.

3. The nozzle in accordance with claim 1, wherein a blind hole is provided at a side of the seat region facing the nozzle tip.

4. The nozzle in accordance with claim 1, wherein the orifice is a hole drilled by means of laser.

5. The nozzle in accordance with claim 1, wherein the seat region is a funnel-shaped or cylindrical region that converges in a direction of the nozzle tip and/or approximately corresponds to a jacket surface of a truncated cone that converges in the direction of the nozzle tip.

6. The nozzle in accordance with claim 3, wherein the orifice enters into the reception hole of the nozzle at a level of the seat region or in the seat region.

7. The nozzle in accordance with claim 6, wherein the orifice enters into the reception hole of the nozzle at a level of the blind hole.

8. The nozzle in accordance with claim 2, wherein the longitudinal axis of the orifice includes an angle to a normal plane of the longitudinal axis of the nozzle that amounts to at least 15°.

9. A method of producing a nozzle, said method comprising:
producing an orifice of the nozzle for discharging fuel by means of laser drilling; and
producing a reception hole for receiving a nozzle needle that hollows out the nozzle along its longitudinal extent, wherein
the reception hole is produced such that it has a seat region for a sealing closing with the nozzle needle to enable a fuel supply to the orifice based on a position of the nozzle needle,
wherein,
on drilling of the orifice by a laser, a drilling axis of the laser is directed toward a region of the reception hole that adjoins, and is distant from, a side of the seat region remote from a tip of the nozzle.

10. The method in accordance with claim 9, wherein the drilling axis is aligned during drilling such that a longitudinal axis of the orifice includes an angle to a normal plane of the longitudinal axis of the nozzle that amounts to at least 15°.

11. The nozzle in accordance with claim 2, wherein the longitudinal axis of the orifice includes the angle to a normal plane of the longitudinal axis of the nozzle that amounts to at least 25°.

12. The nozzle in accordance with claim 2, wherein the longitudinal axis of the orifice includes the angle to a normal plane of the longitudinal axis of the nozzle that amounts to at least 50°.

13. The method in accordance with claim 9, wherein the drilling axis is aligned during drilling such that a longitudinal axis of the orifice includes an angle to a normal plane of the longitudinal axis of the nozzle that amounts to at least 25°.

14. The method in accordance with claim 9, wherein the drilling axis is aligned during drilling such that a longitudinal axis of the orifice includes an angle to a normal plane of the longitudinal axis of the nozzle that amounts to at least 50°.

* * * * *